Dec. 1, 1931.　　　　R. F. MULLEN　　　　1,834,722
METHOD OF MAKING CLUTCH MEMBERS
Filed Aug. 6, 1929
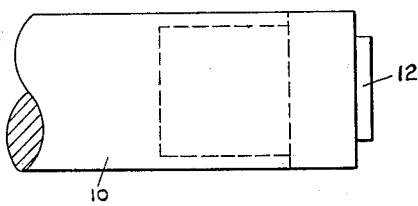
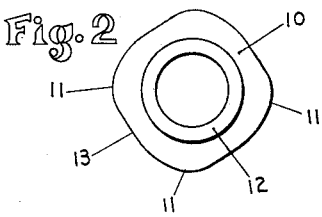
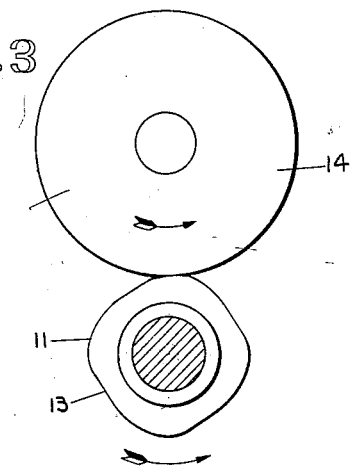
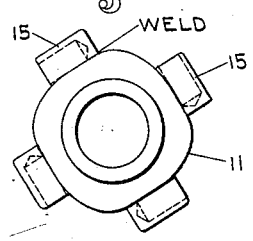
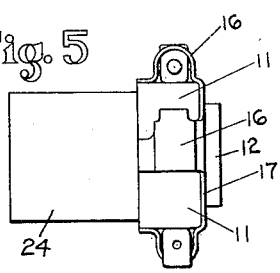
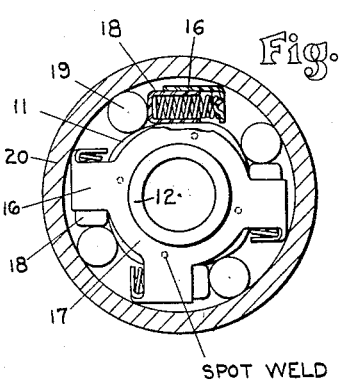
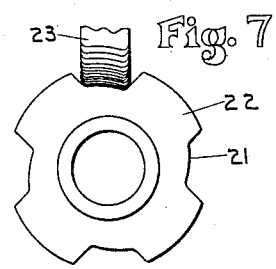
Inventor
Raymond F. Mullen
by his attorney
Farnum F. Dorsey Patented Dec. 1, 1931

1,834,722

UNITED STATES PATENT OFFICE

RAYMOND F. MULLEN, OF ROCHESTER, NEW YORK, ASSIGNOR, BY MESNE ASSIGNMENTS, TO NORTH EAST APPLIANCE CORPORATION, OF ROCHESTER, NEW YORK, A CORPORATION OF NEW YORK

METHOD OF MAKING CLUTCH MEMBERS

Application filed August 6, 1929. Serial No. 383,947.

This invention relates to the manufacture of driving clutches of the overrunning or one-way type.

In clutches of the type in question it is common to use an outer member or shell with a smooth cylindrical surface, and a concentric inner member having a series of cam-like portions. Between these cam portions and the shell are interposed a series of rollers adapted to wedge between the clutch members, to prevent relative rotation in one sense, and the rollers are held to their work by spring followers arranged to press the rollers towards the higher ends of the cam surfaces.

To provide guides or supports for the spring followers it is common to form the cam member with integral radial projections interposed between the cam surfaces, these projections being bored to provide sockets in which the spring followers can slide. Owing to the present of these projections it is necessary to form the cam surfaces by a succession of transverse milling and grinding operations, and the accurate formation of these surfaces requires that an accurately formed periphery be maintained upon the grinding wheel. These forming operations are relatively expensive, and the expense of the usual construction is further enhanced by the necessity of using a forging or a bar of relatively large diameter in making the cam member of the clutch.

The object of the present invention is to produce a cam member for the purpose in question, which shall have all the advantages of the usual form, by a method permitting the use of relatively inexpensive material and simple and inexpensive machining operaations. To this end it is proposed to form the cam member, in the first place, without any integral projections between the cam surfaces, and thereafter to attach separate guide members or projections for receiving the spring followers. This method permits the formation of the cam member from a bar or forging approximating closely to the final form of the cam member with respect to the cam surfaces, so that no machine operation other than grinding is necessary to complete the formation of the cams, and this grinding may be performed as a single continuous rotary operation by the use of a plain cylindrical wheel. The follower guides may then be formed and attached in various ways involving relatively small expense.

In the accompanying drawings Fig. 1 is a side elevation of a piece of steel bar suitably formed for use in the method herein disclosed, with one end partially formed by a turning operation; Fig. 2 is a right-hand end view of the same bar; Fig. 3 shows the grinding operation by which the cams and intermediate surfaces of the cam member are finished; Fig. 4 is an end view showing the finished cam member, with a series of follower guides secured thereto by welding against the surfaces between the cam projections; Fig. 5 is a side elevation of a similar cam member, provided with follower guides formed integrally from a single piece of sheet material; Fig. 6 is an end view showing the cam member of Fig. 5 in a completely assembled clutch, with parts shown in section; and Fig. 7 is an end view of a cam member of the previous form, hereinbefore described, illustrating the operation of form-grinding one of the cam surfaces.

In accordance with the present method, as illustrated in the accompanying drawings, the stock or material for the body of the cam member is provided in the form of a steel bar 10, which is rolled to a form closely approximating the peripheral form of the finished member. As shown in Fig. 2, the bar has four salient portions 11, corresponding to the cam surfaces, and four intermediate portions 13, which may be flat and which constitute tangent extensions from the ends of the cam surfaces.

The bar 10 is first bored and turned in a lathe, and is shown as provided with a short cylindrical projection 12. As shown in Fig. 5, and in dotted lines in Fig. 1, it may be provided also with a shank 24 of reduced diameter.

The only operation necessary to finish the periphery of the cam member is done upon a grinding machine of the rotary type. Preferably it is ground approximately to final form while soft, and is given its finished form by a second grinding operation after hardening. Both of these operations are performed as shown in Fig. 3, the cam member being rotated on a mandrel while its periphery is ground by a cylindrical grinding wheel 14, so that all of the cam surfaces are formed successively by a single continuous operation. The exact form of the cam surfaces and the intermediate surfaces is determined by changing and controlling the distance between the axes of the mandrel and the grinding wheel as the mandrel rotates, and this is, or may be, performed automatically by machines of a well known type designed for this mode of operation.

To finish a cam member it is then necessary only to provide it with follower guides. One simple way of doing this is to weld suitable metal blocks 15 directly to the intermediate surfaces of the cam member, as shown in Fig. 4. This may be done electrically, in a well known manner. Another and preferable way to provide the follower guides however, is to form them as a series of pockets 16 in an integral sheet-metal member, in which the pockets are connected by a flat ring 17, as shown in Figs. 5 and 6. This sheet-metal member may be formed inexpensively by a series of stamping and bending operations, in a manner which will be obvious to those skilled in the art. The sheet-metal member is centered upon the end projection 12, and to hold it in place and prevent accidental rotary movement upon the cam member it may be secured by a series of spot welds, as indicated in Fig. 6. Fig. 6 shows the spring followers as comprising hollow plungers 18, inclosing coil springs and arranged to slide in the pockets 16. This figure shows also the rollers 19 and the outer clutch member or shell 20, in their proper respective positions.

Fig. 7 illustrates the previously used method of construction, in which the diameter of the stock is relatively great, owing to the necessity of providing radial intermediate projections 22, and in which the presence of these projections necessitates the transverse grinding of the cam surfaces by means of a formed grinding wheel 23, of which a portion is shown.

In addition to the other advantages mentioned, it has been found that the operation of the clutch is improved by the fact that the marks left by the grinding wheel extend peripherally along the cam surfaces instead of being transverse as in the previous method of construction.

The invention claimed is:

1. The method of making a clutch member, of the kind set forth, which consists in forming material with a cross section approximating the finished outline, comprising a series of cam surfaces and a series of intermediate surfaces, finishing the cam surfaces by a continuous rotary grinding operation, and fixing spring-follower guide-projections over said intermediate surfaces.

2. The method of making a clutch member, of the kind set forth, which consists in rolling a bar with a cross section approximating the finished outline, comprising a series of cam surfaces and a series of intermediate flat surfaces tangentially connecting the cam surfaces, turning and boring a length of said bar, grinding the cam surfaces to final form, and fixing spring-follower guide projections over said intermediate surfaces.

3. The method of making a clutch member, of the kind set forth, which consists in forming a body of material with a cross section comprising a series of cam surfaces and a series of intermediate surfaces lying within the radius of the cam surfaces, and welding spring-follower guide projections to said body in position over said intermediate surfaces.

RAYMOND F. MULLEN.